Figure 1:
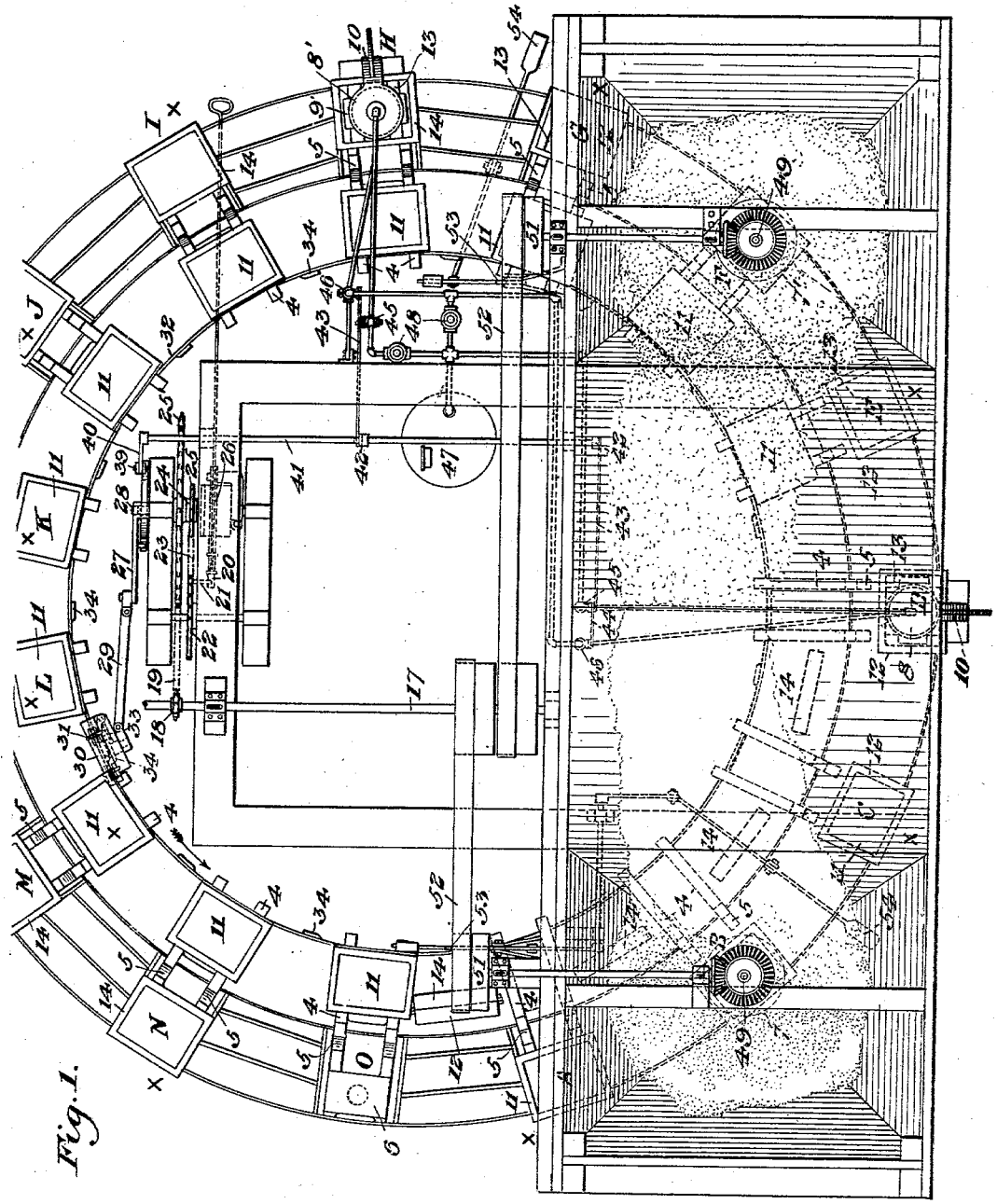

No. 717,577. PATENTED JAN. 6, 1903.
G. G. HOWE.
SAND MOLDING MACHINE.
APPLICATION FILED MAR. 12, 1901.
NO MODEL. 6 SHEETS—SHEET 1.

WITNESSES

INVENTOR
Glenn G. Howe
by Bakewell & Bakewell
his Attorneys

No. 717,577. PATENTED JAN. 6, 1903.
G. G. HOWE.
SAND MOLDING MACHINE.
APPLICATION FILED MAR. 12, 1901.
NO MODEL. 6 SHEETS—SHEET 2.
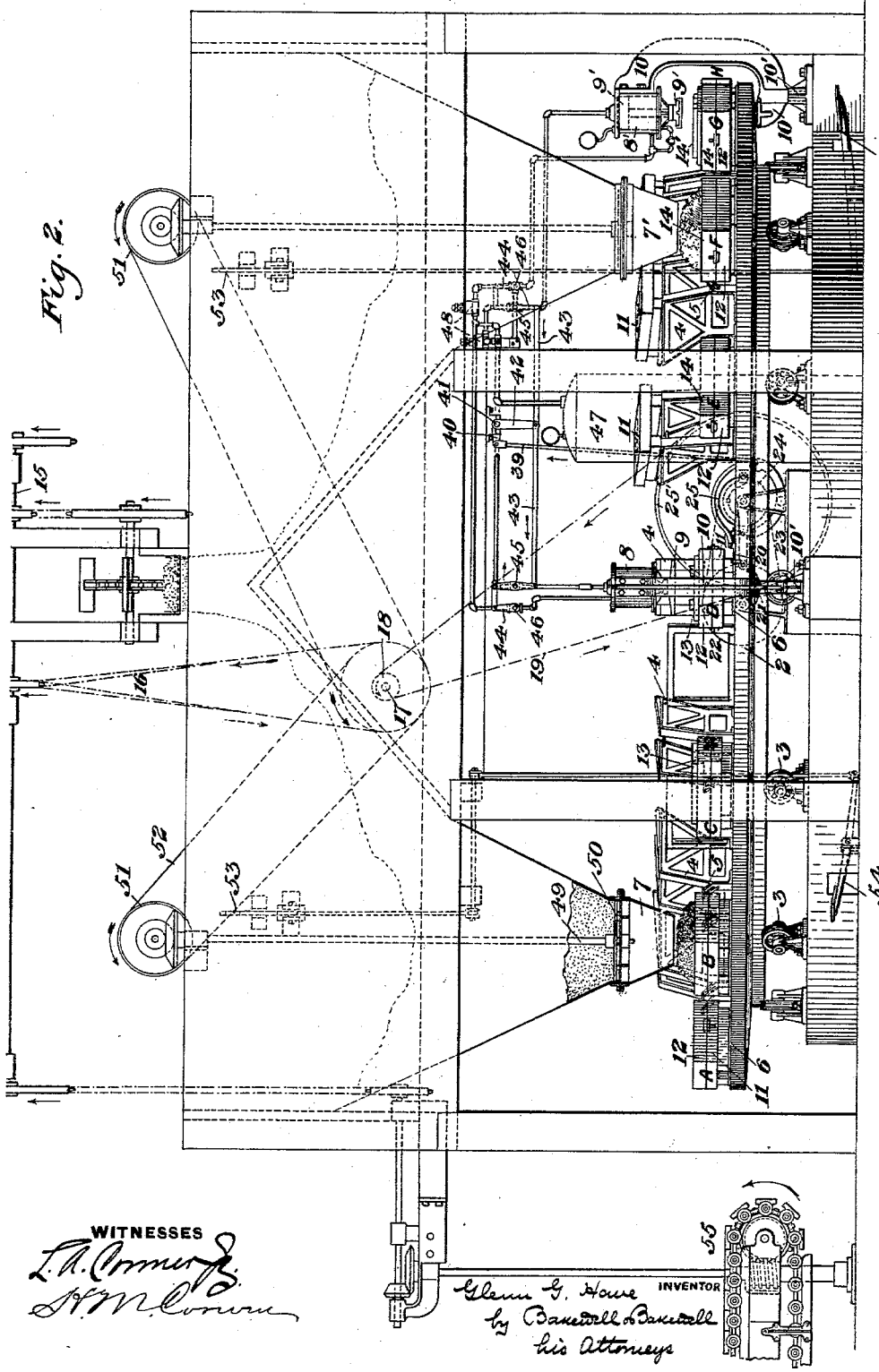
WITNESSES
Glenn G. Howe INVENTOR
by Bakewell & Bakewell
his Attorneys

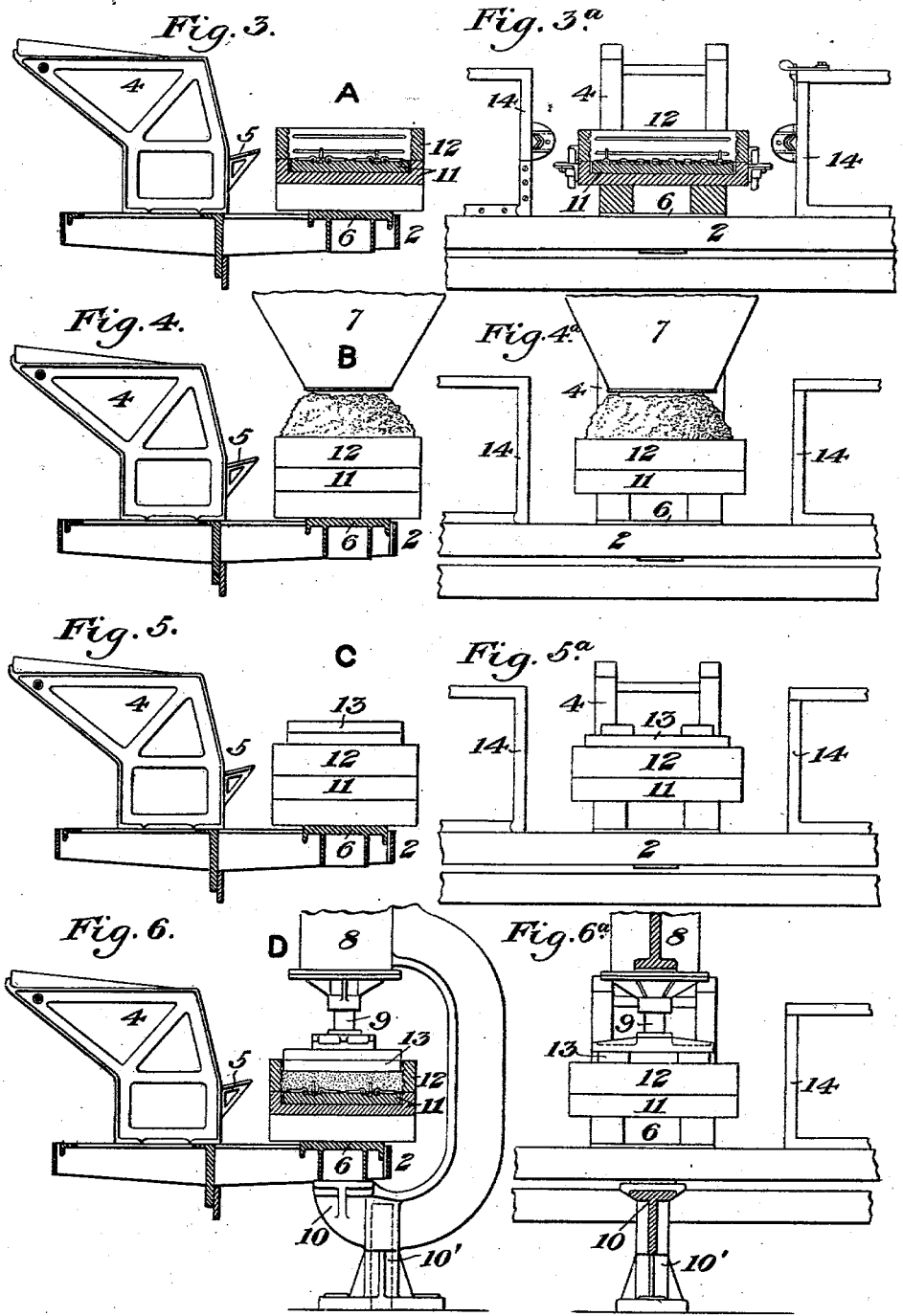

No. 717,577. PATENTED JAN. 6, 1903.
G. G. HOWE.
SAND MOLDING MACHINE.
APPLICATION FILED MAR. 12, 1901.
NO MODEL. 6 SHEETS—SHEET 4.
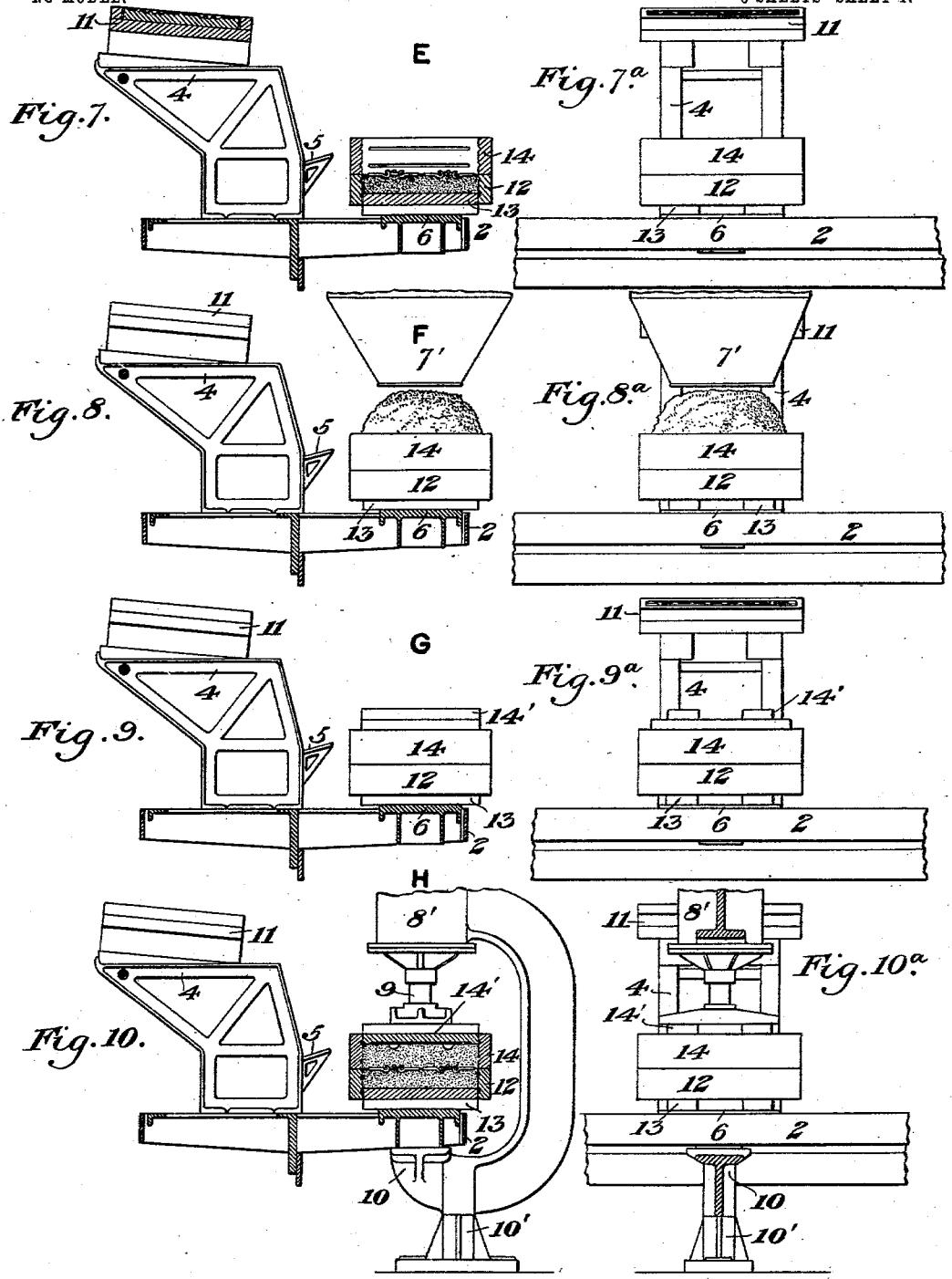

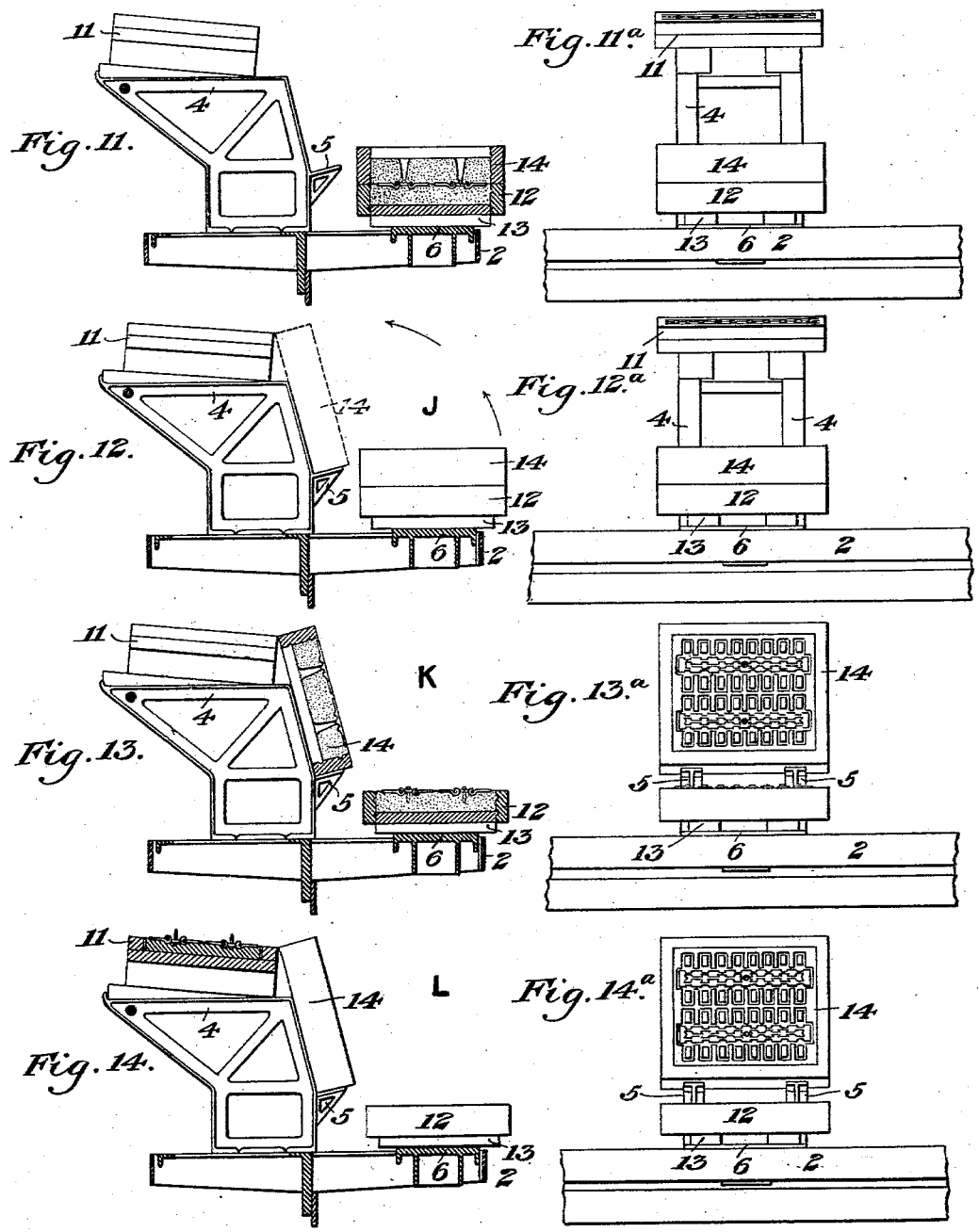

No. 717,577. PATENTED JAN. 6, 1903.
G. G. HOWE.
SAND MOLDING MACHINE.
APPLICATION FILED MAR. 12, 1901.
NO MODEL. 6 SHEETS—SHEET 6.
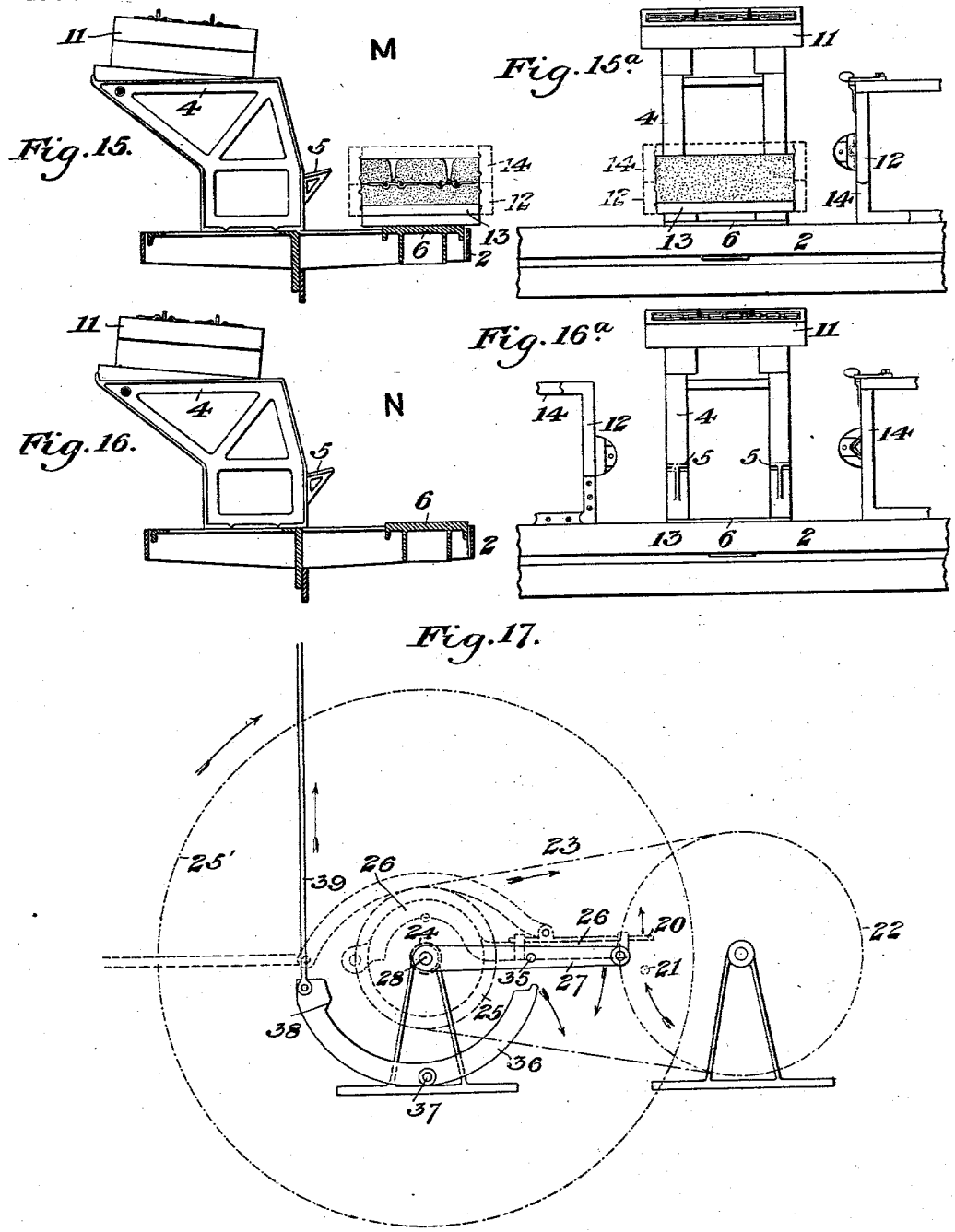

UNITED STATES PATENT OFFICE.

GLENN GRENVILLE HOWE, OF INDIANAPOLIS, INDIANA.

SAND-MOLDING MACHINE.

SPECIFICATION forming part of Letters Patent No. 717,577, dated January 6, 1903.

Application filed March 12, 1901. Serial No. 50,834. (No model.)

*To all whom it may concern:*

Be it known that I, GLENN GRENVILLE HOWE, of Indianapolis, Marion county, Indiana, have invented a new and useful Sand-Molding Machine, of which the following is a full, clear, and exact description, reference being had to the accompanying drawings, forming part of this specification, in which—

Figure 1 is a plan view of my machine. Fig. 2 is a side elevation, showing stations A to H, inclusive. Figs. 3, $3^a$, 4, $4^a$, 5, $5^a$, 6, $6^a$, 7, $7^a$, 8, $8^a$, 9, $9^a$, 10, $10^a$, 11, $11^a$, 12, $12^a$, 13, $13^a$, 14, $14^a$, 15, $15^a$, and 16, $16^a$ are side and front elevations of a part of the table and the rests thereon, showing the positions of the parts at the successive stations of the machine. Fig. 17 is a diagrammatic view of the clutch mechanism for starting and stopping the table.

The object of my invention is to provide means by which the making of sand molds can be practiced more quickly and with less labor than heretofore. Its use results in a very large increase of the output of a molding-shop.

The invention consists in a carrier, preferably a circular table, adapted to carry a series of snap-flasks and matches successively to a number of stations at which, or at some of which, operatives stand to perform the work required, sand-feeding mechanism and sand-squeezing mechanism being arranged at appropriate stations to supply the molding-sand and to compress it within the flask. As shown in the drawings, my machine has fourteen stations, and for convenience I illustrate them diagrammatically in side and front elevations on Sheets 3 to 6 of the drawings, to which I will presently refer.

In Figs. 1 and 2, 2 represents a rotary table mounted, preferably, on supporting-rollers 3 3 and driven with an intermittent step-by-step motion, each step carrying it through a certain arc of its circumference—in the case shown in the drawings through one-fifteenth of its circumference—so as to advance each flask from one station to the next. The table has a number of racks or rests 4 for holding the matches and copes when they are not in use. There are preferably fifteen of such racks or rests, their surfaces being adapted to receive the matches, and brackets or steps 5 being provided for the copes. In front of each rack is a bench 6, upon which the matches and the parts of the snap-flasks are set while the molder is working upon them.

By the term "match" used in this specification I mean a pattern-support or false mold-section, (marked 11 in the drawings,) made, preferably, of a dried compound of sand and oil and having surface recesses adapted to fit and hold the pattern while the drag is placed thereover and filled with sand, the pattern being freely removable from the pattern-support, so that when the parts are turned over and the pattern-support lifted from the drag it will leave the pattern lying on the surface of the drag ready to receive the cope.

I have indicated on the drawings by reference-letters the several stations to which the molds are carried, and each station at which it is desirable to have an operative I have designated by the letter X. At station B is a sand-spout the mouth of which is directly over the table and which is operated so as to deliver a charge of sand into the flask by a workman who may stand at station C. At station D is a press the plunger of which is directly above the position of the flask at that station. This press, as shown in Figs. 2 and 6, is composed, preferably, of a cylinder 8, having a plunger 9, and the cylinder has an arm 10, which extends downwardly beneath the table 2 and is supported loosely on a stool 10', so that when the plunger is depressed against the mold the arm 10 will be raised thereby and caused to bear against the under side of the table. Injurious down pressure upon the table is prevented, and the action is such that equal and regular pressure is brought to bear upon all parts of the mold. The valve which admits air to the cylinder 8 is preferably worked automatically by motion of the table, so that as each mold is brought under the plunger the squeezing of the sand is done without the need of direction on the part of the workmen. At station F is a second sand-spout 7' for supplying sand to the flask for the cope, and at station H is a second press 8', constructed as above described.

The preferable operation is as follows: At station A the workman who stands there places the match 11 on the bench before him and sets the drag part 12 of the flask upon it. After a pause sufficient for the performance of the work at the several stations the table advances one step, bringing the flask under consideration to station B, where it is charged with sand from the spout 7. The next step brings it to station C, where a workman tucks with his fingers the sand around the edges of the drag, scrapes off superfluous sand, and places a bottom board 13 upon it. At station D the flask is between the jaws of the press, which, acting upon the bottom board 13 on one side and upon the under surface of the table on the other side, squeezes the sand. When the press recedes, the table moves to station E, where the workman turns the drag and match over, removes the match, and places it on the rack 4, places the cope part 14 of the flask upon the drag, and sprinkles the latter with parting sand. At station F a supply of sand is delivered to the cope. At station G the sand is tucked, the superfluous sand scraped off, and the cope-board 14' placed upon it. At station H the cope is squeezed by the press 8', the power exerted by which is preferably less than that of the press 8. At station I the cope-board is removed and the sprue-holes cut by a workman. At station J the pattern is rapped in order to loosen it from the sand, and the cope is removed and set on the bracket 5. At station K the pattern is drawn and placed in the match. At station L the cores, if any, are set in the mold, and at station M the cope is set on the drag and the snap-flask is removed, leaving the sand mold ready to be taken from the table at station N for use. It will be understood that the operations above described are repeated as the molds in succession arrive at the respective stations, so that there are fourteen molds in course of manufacture at once, and the work proceeds with great rapidity. Moreover, as each workman has only a single operation to perform and repeats that operation on each mold as it reaches him he will be quick to learn, and unskilled workmen can therefore be employed.

The power mechanism is preferably as follows:

15 is the main power-shaft, which drives the rotating table through a cross-belt 16, counter-shaft 17, sprocket-wheel 18, and chain belt 19. This portion of the mechanism may be constantly in motion, but does not actuate the mechanism by which the table is rotated unless a sliding rod 20 is projected into the path of a pin 21 upon the sprocket-wheel 22. The sprocket-wheel 22 is driven by a chain 23, which passes around a wheel 25 on a sleeve 24, which is also provided with a sprocket-wheel 25', driven by belt 19 from the sprocket-wheel 18 on the shaft 17. The pin 21 on the wheel 22 by engaging the sliding rod 20 lifts the lever 26, allowing the pin-clutch to engage the other clutch member, and thereby form a driving connection between them, so that the crank-arm 27 at the end of the shaft 28 is rotated in the direction of the arrow shown in Fig. 17. A pitman-rod 29 is connected to the outer end of this crank-arm and at its opposite end is connected to a carriage 30, mounted upon suitable wheels 31, which run upon the inner rim 32 of the mold-carrier. This carriage is provided with a spring-actuated dog 33, which is adapted to engage projections 34 upon the rim 32 in such a manner that as the crank-arm 27 is rotated the carriage is reciprocated thereby, moving the table one step for each rotation of the shaft 28. The crank-arm 27 is provided with a pin 35, which engages a curved lever 36, pivoted at 37 and provided at its opposite end with a cam portion 38, by which the lever is reset into its initial position. A connecting-rod 39 is preferably connected to this end of the lever and operates a crank-arm 40, mounted on a rock-shaft 41. A crank-arm 42, mounted on this rock-shaft 41, is connected by a link 43 to a lever mechanism 44, secured to the valve-stem of valves 45 and 46, so as to open and close their ports and admit and exhaust the air alternately from the opposite ends of the cylinders of the presses 8 and 8', to which they are connected by suitable pipe connections. The valves 45 and 46, controlling the cylinders of the presses 8 and 8', are both arranged to operate simultaneously as the rock-shaft 41 is rocked by the curved lever 36. Air is supplied to the press-cylinders from a suitable tank 47 through pipe connections provided with regulating-valves 48 of any suitable type. These motions of the table and of the cylinders are continued automatically until the workman pulls back the rod 20, and thus stops the mechanism.

The feeding of the sand from the hoppers may be controlled by shafts 49, carrying stirrers 50, the rotation of which causes the sand to pass from the mouth of the hopper. The shafts 49 are driven from belt-pulleys 51, which may be started and stopped by shifting the driving-belt 52 by means of a suitable shifter 53, worked by a pedal 54 or otherwise. 55 is an endless carrier, which may be continuously driven and which serves to carry away the molds after they have been finished and lifted from the table of the machine.

Those skilled in the art can modify the form and arrangement of the parts without departure from my invention and may divide the work at the several stations differently from the division above described or may use a greater or less number of stations, since

What I claim is—

1. Molding apparatus comprising a movable carrier adapted to carry snap-flasks and also pattern-supports having surface recesses adapted to fit and hold a pattern removably set therein, snap-flasks and such removable pattern-supports, carried by the carrier, and sand-feeding and sand-pressing devices arranged at appropriate stations; substantially as described.

2. Molding apparatus comprising a movable carrier adapted to carry snap-flasks and matches to successive stations, snap-flasks and matches carried by the carrier, and sand-feeding and sand-pressing devices arranged at appropriate stations, said carrier at its respective divisions being provided with side rests for holding the matches and copes; substantially as described.

3. Molding apparatus comprising a movable carrier adapted to carry snap-flasks and matches to successive stations, mechanism for moving the carrier intermittently, snap-flasks and matches supported on the carrier, a sand-pressing device at one of the stations, and connections actuated by the rotation of the table arranged to automatically actuate the sand-pressing device; substantially as described.

4. In molding apparatus, the combination of a movable mold-carrier, a sand-squeezing device comprising a plunger and a lower arm between which the mold-carrier travels, and a support on which the arm is loosely supported during its periods of rest; substantially as set forth.

5. A molding apparatus, comprising a carrier, a series of work benches or tables and separate supports for matches and flasks on said carrier, and sand-feeding and sand-pressing devices arranged at appropriate stations; substantially as described.

6. A molding apparatus, comprising a movable carrier, a series of work benches or tables on said carrier, and a separate support for a match and flask adjacent to each work-bench; substantially as described.

7. A molding apparatus, comprising a movable carrier, a series of work benches or tables on said carrier, a separate support for a match and flask adjacent to each work-bench, and sand-feeding and sand-pressing devices arranged at appropriate stations; substantially as described.

8. A molding apparatus, comprising a movable carrier, a series of work benches or tables on said carrier, and a support for a match and an inclined support for a flask adjacent to each work-bench; substantially as described.

9. A molding apparatus, comprising a movable mold-carrier, and a sand-squeezing device having a plunger and lower arm arranged to simultaneously bear against a mold and the under side of the mold-carrier, said sand-squeezing device being bodily movable to avoid downward thrust on the mold-carrier; substantially as described.

10. Molding apparatus comprising a movable carrier, mechanism for moving the same intermittently, a match supported on the carrier, a flask set upon the match, and a pressing device at a suitable station arranged to press the sand in the flask upon the pattern of the match; substantially as described.

11. Molding apparatus comprising a movable carrier, mechanism for moving the same intermittently, a match upon the carrier at one station, a flask-section set thereon, successive sand-feeding and sand-pressing stations, a further station where the other flask-section is set upon the inverted first flask-section, sand-feeding and sand-pressing devices at successive stations for the second flask-section, and successive stations where the pattern is removed and the mold assembled; substantially as described.

In testimony whereof I have hereunto set my hand.

GLENN GRENVILLE HOWE.

Witnesses:
H. D. GORDON,
C. E. PROUSE.